United States Patent [19]

Oguchi et al.

[11] 4,447,467
[45] May 8, 1984

[54] METHOD AND APPARATUS FOR PERPENDICULAR MAGNETIC RECORDING MEDIUM

[75] Inventors: Toshihiko Oguchi, Atsugi; Hirohisa Kato, Ebina; Hirotaka Yokoyama, Yokosuka, all of Japan

[73] Assignee: Tokyo Shibaura Denki Kabushiki Kaisha, Kawasaki, Japan

[21] Appl. No.: 478,103

[22] Filed: Mar. 23, 1983

[51] Int. Cl.³ .................. H01F 10/02; B05C 11/00; B05D 3/06; B05B 5/00
[52] U.S. Cl. ........................ 427/48; 118/59; 118/68; 118/640; 427/128; 427/130; 427/348
[58] Field of Search ............... 427/48, 128, 130, 348; 118/640, 59, 68

[56] References Cited

FOREIGN PATENT DOCUMENTS 55-163633 12/1980 Japan .

Primary Examiner—Bernard D. Pianalto
Attorney, Agent, or Firm—Oblon, Fisher, Spivak, McClelland & Maier

[57] ABSTRACT

To manufacture a perpendicular magnetic recording medium, a nonmagnetic substrate having a coating layer of a binder with magnetic particles dispersed therein is passed through a magnetic field in a direction substantially perpendicular thereto, and a perpendicular orientation of the magnetic particles is performed as the substrate passes through an upstream region of the magnetic field. A viscosity of the coating layer is increased in a downstream region of the magnetic field, thereby restricting further movement of the magnetic particles in the coating layer before the nonmagnetic substrate is removed from the magnetic field.

12 Claims, 3 Drawing Figures

METHOD AND APPARATUS FOR PERPENDICULAR MAGNETIC RECORDING MEDIUM

BACKGROUND OF THE INVENTION

I. Field of the Invention

The present invention relates to a method and an apparatus for manufacturing a perpendicular magnetic recording medium.

II. Description of the Prior Art

Magnetic recording has been based on magnetization along the longitudinal direction of the plane of the recording medium. However, when an attempt is made to perform high density recording in such a system, the demagnetizing field within the recording medium increases. Thus, it is difficult to achieve very high density recording with this recording system.

In order to eliminate such a difficulty, a perpendicular magnetic recording system has recently been proposed which is based on magnetization along the perpendicular direction to the plane of the recording medium. In such a recording system, the demagnetizing field within the recording medium decreases when the recording density is increased, so that this system is quite suitable for high density recording. With the perpendicular magnetic recording system, it is necessary that the axis of easy magnetization be normal to the surface of the recording medium. Among such recording media, there is known a recording medium which is obtained by mixing magnetic particles with a binder, coating the mixture on a nonmagnetic tape, and introducing the tape into a magnetic field such that the plane of the tape is normal to the direction of the magnetic field. As a result, the axis of easy magnetization of the magnetic particles aligns along the direction of the magnetic field. After drying, a recording medium suitable for perpendicular recording is obtained.

As the magnetic particles, hexagonal ferrites such as barium ferrite ($BaFe_{12}O_{19}$) are usually used. These hexagonal ferrite particles are in plate form and the axis of easy magnetization is normal to the plane of the surface so they are advantageous in that perpendicular orientation may be easily accomplished by magnetic field orientation processing. However, in order to use the hexagonal ferrites as a perpendicular magnetic recording powder, certain conditions must be satisfied.

For example, the hexagonal ferrites are too high in coercive force iHc (generally over 5,000 oersteds) to be recorded by the usual magnetic head. Thus, it is necessary to reduce the coercive force to a value suitable for vertical magnetic recording.

Further, it is preferred that the crystal size of the hexagonal ferrites be controlled within a range of 0.01-0.3 $\mu$m for perpendicular magnetic recording. When the crystal size is less than 0.01 $\mu$m, the ferromagnetism necessary for magnetic recording is not obtained, and when it exceeds 0.3 $\mu$m, high density magnetic recording cannot be achieved. When the particle size is 0.2 $\mu$m or less, particularly good results can be obtained.

It is further required that the hexagonal ferrites be homogeneously dispersed in a medium such as a binder or paint. Therefore, it is necessary that individual ferrite particles not aggregate at least during preparation thereof.

A hexagonal ferrite having a relatively low coercive force, good dispersibility and the desired particle size can be obtained by a glass crystallization technique, using hexagonal ferrite-forming components including a coercive force-reducing element as a starting material together with a glass-forming component.

However, when the magnetic particles of this type are dispersed within the binder, and the resultant mixture is applied to a substrate so as to perpendicularly orient the magnetic particles by means of the magnetic field, the following phenomenon often occurs. As previously described, when the substrate having a coating layer thereon is introduced into a magnetic field in a direction perpendicular to a direction of the magnetic flux of the magnetic field, the magnetic particles in the coating layer are oriented such that their axis of easy magnetization coincides with the direction of the magnetic flux. However, when the magnetic field is removed or the coated substrate is removed from the magnetic field after orientation of the magnetic particles, each magnetic particle serves as a very small magnet generating a magnetic field (demagnetizing field) applied in a direction opposite to that of the magnetic field for orienting the magnetic particles. If some magnetic particles are present which generate a demagnetizing field applied in a direction inclined by a given angle with respect to the vertical direction, then the perpendicularly oriented magnetic particles are subjected to torque by the demagnetizing field, thereby greatly impairing the perpendicular orientation of the magnetic particles. The recording characteristics of the perpendicular magnetic medium are greatly influenced by a perpendicular orientation ratio (%) (the average of direction cosines of easy axes of particles relative to perpendicular direction, or the ratio of the number of vertically oriented magnetic particles to the total number of magnetic particles); the higher the orientation ratio, the higher the reproduced output power and the recording density.

SUMMARY OF THE INVENTION

It is, therefore, an object of the present invention to provide a method and an apparatus for manufacturing a perpendicular magnetic recording medium with a high perpendicular orientation ratio of magnetic particles.

In order to achieve the above and other objects of the present invention which will become apparent from the following detailed description, there is provided a method and an apparatus for manufacturing a perpendicular magnetic recording medium wherein a nonmagnetic substrate having a coating layer of a binder with magnetic particles dispersed therein is passed through a magnetic field in a direction substantially perpendicular thereto, a perpendicular orientation of the magnetic particles is performed as the substrate passes through an upstream region of the magnetic field, and a viscosity of the coating layer is increased in a downstream region of the magnetic field, thereby restricting further movement of the magnetic particles in the coating layer before the nonmagnetic substrate is removed from the magnetic field.

The magnetic particles thus restricted are fixed in the coating layer before they are removed from the magnetic field, thereby preventing disturbance of the orientation after they are removed from the magnetic field.

The viscosity of the coating layer immediately before the substrate is introduced into the magnetic field, or within the upstream region of the magnetic field, is sufficient to allow perpendicular orientation of the magnetic particles by the magnetic field (i.e., coincidence of the axis of easy magnetization of the magnetic particles with the direction of the magnetic field). A viscosity of the coating layer is generally $5 \times 10^4$ centipoises or less as measured at a shearing speed of 8.0 sec$^{-1}$.

It has been found that a viscosity of the coating layer should be about $10^5$ centipoises or more as measured at a shearing speed of 8.0 sec$^{-1}$ so as to sufficiently restrict movement of the magnetic particles in the downstream region of the magnetic field after the orientation of the magnetic particles and before the substrate is removed from the magnetic field.

According to the present invention, magnetic particles having a particle size of 0.2 μm or less, especially hexagonal ferrite particles, are intended to be used to obtain preferred magnetic recording characteristics. It has been found that a magnetic field intensity required for orienting magnetic particles which have the above-mentioned particle size is 4,000 oersteds or more.

DETAILED DESCRIPTION OF THE PREFERRED EMBODIMENTS

Figure 1:
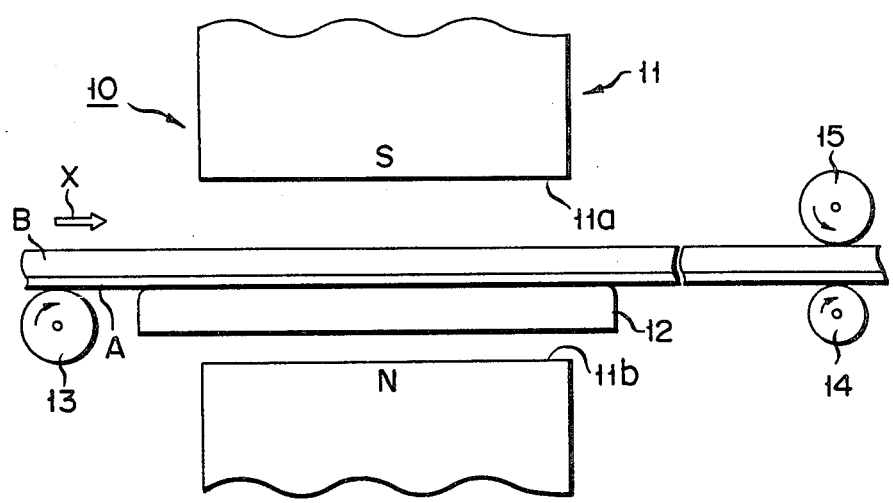
FIG. 1 is a schematic view showing an apparatus for manufacturing a perpendicular magnetic recording medium according to a first embodiment of the present invention.

A nonmagnetic substrate such as a polyester tape is prepared to manufacture a perpendicular magnetic recording medium. The nonmagnetic substrate has a coating layer thereon. The coating layer includes a binder such as a thermoplastic resin, and magnetic particles which are uniformly dispersed within the binder. A particle size of the magnetic particles is 0.2 μm or less, and generally, 0.01 μm or more. When the particle size of the magnetic particle exceeds 0.2 μm, satisfactory recording characteristics of the recording medium cannot be obtained.

The magnetic particles may comprise a material such as gamma-ferrite and chromium dioxide, both of which are used as a magnetic material for a general magnetic tape. The magnetic particles preferably comprise hexagonal ferrite which has the following formula:

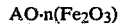

where A is at least one element selected from the group consisting of barium, strontium, lead and calcium, and n is 5 to 6.

Some of the Fe ions in the ferrite of the above formula may preferably be substituted with a coercive force-reducing element in order to control the coercive force of the ferrite within a desired range suitable for recording by a conventional magnetic head. Such a substituted ferrite can be represented by the formula:

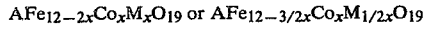

where A is at least one element selected from the group consisting of barium, strontium, lead and calcium, M is at least one tetravalent element selected from the group consisting of titanium and germanium or at least one pentavalent element selected from the group consisting of vanadium, niobium, antimony and tantalum, and x is a value from 0.5 to 1.1.

In order to obtain the hexagonal ferrites, a glass crystallization technique is conveniently used wherein a mixture of ferrite-forming components including metal oxide or metal oxide precursor components of the ferrite and a glass-forming component such as boron oxide is melted, together with a glass-modifier such as barium oxide if desired, at a temperature of 1,200° C. to 1,450° C. The molten mixture is then rapidly cooled to obtain an amorphous material. The cooling of the mixture can be conveniently performed by passing the molten mixture between rotating rolls. The amorphous material can be obtained from between the rolls in a ribbon form. The resultant amorphous material is heat-treated and the desired fine ferrite particles precipitate separated from each other in the glass matrix. The heat treatment for precipitation of the ferrite fine particles is generally performed at 700° to 850° C. for 2 hours or more, usually 4 to 10 hours, in the air. After thus precipitating the desired fine ferrite particles in the amorphous material or glass matrix, the glass matrix is dissolved with a weak acid such as dilute acetic acid and phosphoric acid, obtaining the desired hexagonal ferrites. The particle size of the hexagonal ferrites corresponds to a length of a diagonal line of a hexagonal plane of the ferrite crystal. The hexagonal ferrite crystal preferably has a thickness which corresponds to one-third or less of the length of the diagonal line.

The thus-prepared substrate having the coating layer is introduced into an apparatus 10 shown in FIG. 1. The apparatus 10 has a magnet 11 (permanent or electromagnet) for generating a magnetic field so as to orient the magnetic particles. This magnet comprises an S pole 11a and an N pole 11b which oppose parallel to each other. The magnet 11 must generate a magnetic field which has an intensity of 4,000 oersteds or more. If the intensity of the magnetic field is less than 4,000 oersteds, it has been found that magnetic particles each having a particle size of 0.2 μm or less cannot be sufficiently (80% or more) oriented.

A support roll 13 and a pair of feed rolls 14 and 15 are disposed spaced apart from either side, respectively, of the S and N poles 11a and 11b so as to allow a substrate A having a coating layer B thereon as described above to pass through a space formed between the S and N poles 11a and 11b in a direction indicated by arrow X. A magnetic field is generated by the S and N poles in the space therebetween.

A nonmagnetic support member 12 is disposed between the S and N poles 11a and 11b to support the substrate A such that the surface of the coating layer B is substantially perpendicular to the direction of the magnetic field generated between the S and N poles 11a and 11b (i.e., the surface inclination of the coating layer B should be within 90°±15° with respect to the direction of the magnetic field).

As previously described, according to the present invention, the magnetic particles dispersed in the coating layer B are oriented (perpendicularly oriented) such that their axis of easy magnetization is aligned with the direction of the magnetic field, and the viscosity of the coating layer including the perpendicularly oriented magnetic particles is increased to restrict further movement of the magnetic particles in the above-mentioned magnetic field. It has been found that the perpendicularly oriented magnetic particles can be fixed if a viscosity of the coating layer is at least $10^5$ centipoises as measured at a shearing speed of 8.0 sec$^{-1}$ before the substrate B is removed from the magnetic field.

As may be apparent from the above description, the magnetic field can be divided into two regions in accordance with the travel direction of the base: an upstream region in which the magnetic particles are perpendicularly oriented; and a downstream region in which the viscosity of the coating layer is increased. The viscosity of the coating layer in the upstream region must be $5 \times 10^4$ centipoises or less. If the magnetic particles freely rotate within the coating layer, they may be completely oriented within several milliseconds to several hundred milliseconds. The upper limit of the viscosity of the coating layer is $5 \times 10^4$ centipoises. The viscosity of the coating layer is preferably $2 \times 10^3$ centipoises or more when the substrate A enters the upstream region of the magnetic field. This viscosity can be controlled by controlling the amount of binder in the coating layer and the amount of a solvent added thereto.

The viscosity of the coating layer in the downstream region of the magnetic field can be generally controlled by removing the solvent contained in the coating layer. The solvent can be removed by heating the nonmagnetic support member 12 in the downstream region of the magnetic field in the following manner. Warm water at a predetermined temperature is circulated in the support member 12 which comprises a copper or aluminum vessel. A carbon dispersion type heating sheet or a NESA glass heater may be used as the support member 12 to energize a predetermined portion thereof. Furthermore, an endless rubber belt may be preheated as the support member by a heat medium outside the magnetic field. The support member 12 is not limited to a support plate as shown in FIG. 1. The support member 12 may comprise a plurality of rolls, of which only the rolls in the downstream region of the magnetic field may be heated.

Figure 2:
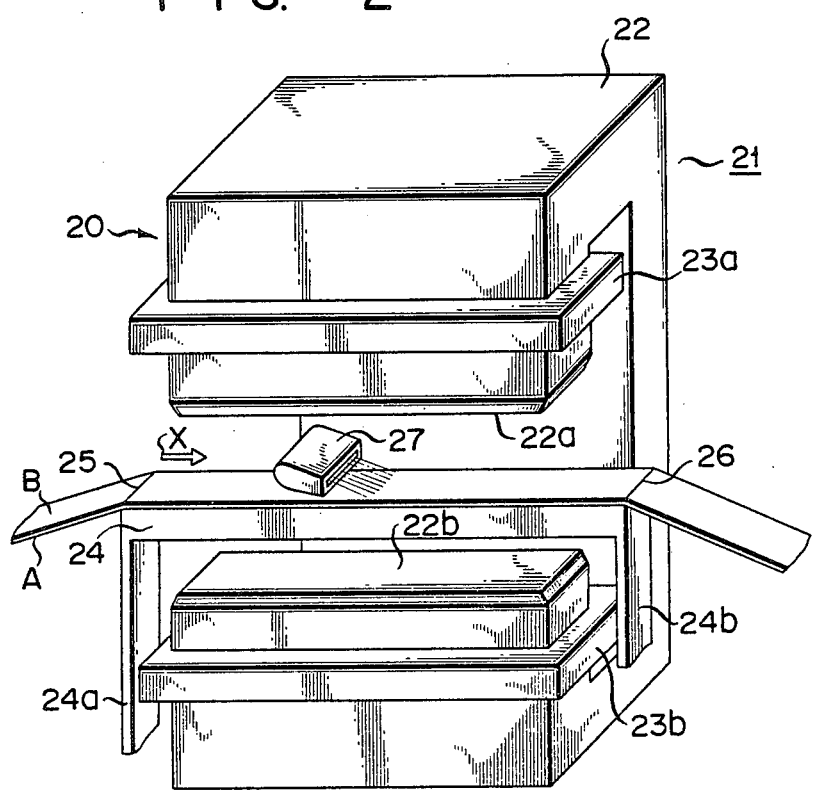
FIG. 2 is a perspective view showing an apparatus for manufacturing a perpendicular magnetic recording medium according to a second embodiment of the present invention.

FIG. 2 shows an apparatus 20 according to a second and preferred embodiment of the present invention. The apparatus 20 has a magnet 21 formed of a soft magnetic core 22 which has two end faces as poles 22a and 22b so as to be parallel to and oppose each other and solenoids 23a and 23b surrounding the core 22 around end faces 22a and 22b. The solenoids 23a and 23b are selectively connected to a DC power source (not shown) such that magnetic fields therefrom respectively have magnetic fluxes in the same direction.

A support member 24 formed of a plate, such as a rigid plastic plate, a glass plate and a nonmagnetic metal plate is disposed between the poles 22a and 22b so as to cross the magnetic field as a whole, and supports the substrate A having the coating layer B thereon such that the substrate can travel thereon in a direction substantially perpendicular to the direction of the magnetic field. The support member 24 is supported by its legs 24a and 24b. The substrate A having the coating layer B is driven in contact with the upper surface of the support member 24 by a feed mechanism (not shown) along a direction indicated by arrow X through the magnetic field. A sufficient tension is applied to the substrate A at portions 25 and 26 (entrance and exit) that the substrate A is brought into tight contact with the support member 24, thereby eliminating indentation caused by wrinkling and twisting of the surface of the substrate A while it is driven between the poles 22a and 22b.

A nozzle 27 is disposed between the pole 22a and the coating layer B so as to dry the surface of the coating layer B. The nozzle 27 is connected to a heated air source (not shown). The nozzle 27 is disposed in the downstream region of the magnetic field generated between the poles 22a and 22b to dry out the coating layer including the magnetic particles which have been perpendicularly oriented in the upstream region of the magnetic field before the coating layer B is removed from the magnetic field, thereby increasing a viscosity of the coating layer to the predetermined value. The heated air from the nozzle 27 is preferably blown toward the direction indicated by the arrow X. This is because, if the heated air from the nozzle 27 blows toward a direction opposite to the direction indicated by the arrow X, the viscosity of a coating layer portion including magnetic particles which have not yet been perpendicularly oriented in the upstream region of the magnetic field is increased. As a result, the orientation ratio may be decreased. The heated air stream is more preferably blown onto the coating layer B in the direction perpendicular to the width of the substrate A. The start position of the drying operation of the coating layer B is thus kept constant.

In the arrangement described above, while the solenoids 23a and 23b are biased and the heated air source is simultaneously operated, the substrate A having the coating layer B which includes magnetic particles is brought into tight contact with and driven on the upper surface of the support member 24 as shown in FIG. 2. The axis of easy magnetization of the magnetic particles is aligned with the direction of the magnetic field between the poles 22a and 22b, in the upstream region of the magnetic field. Furthermore, in the downstream region thereof, heated air is blown from the nozzle 27 onto the coating layer B in the manner described above. Therefore, the vertically oriented magnetic particles are fixed in position by the drying process, and the substrate A having the dried coating layer B is removed from the magnetic field.

Figure 3:
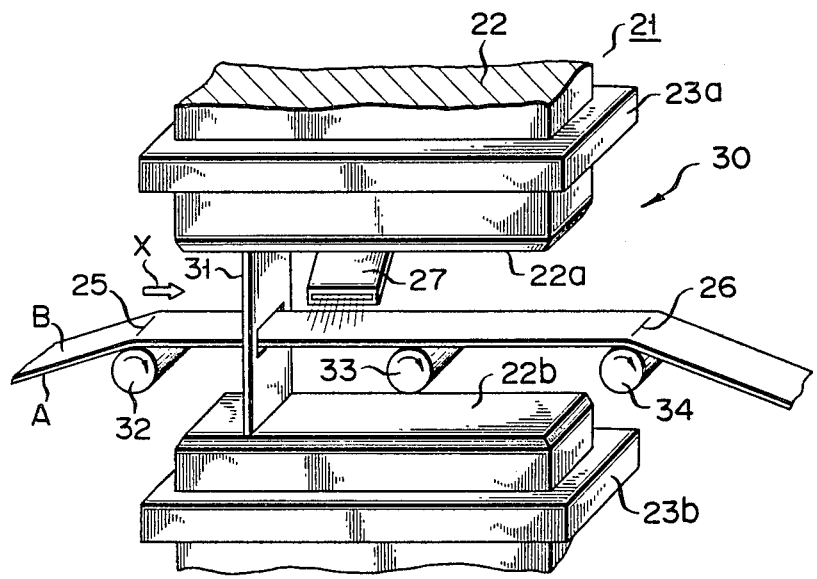
FIG. 3 is a partial perspective view showing a modification of the apparatus shown in FIG. 2.

FIG. 3 shows a modification of the apparatus shown in FIG. 2. The same reference numerals as used in FIG. 2 denote the same parts in FIG. 3. A nozzle 27 of an apparatus 30 blows heated air onto the coating layer B toward a direction perpendicular to the longitudinal direction of the coating layer B. The distance between poles 22a and 22b in this modification can be smaller than that in the embodiment shown in FIG. 2. A shield plate 31 is disposed at a predetermined position (corresponding to the end point of the perpendicular orientation operation of the magnetic particles) so as to dry the coating layer B after substantially all the magnetic particles have been perpendicularly oriented. In this arrangement, the position of the shield plate 31 can be adjusted to change the start position of the drying operation. Rolls 32, 33 and 34 constitute a nonmagnetic support member of the apparatus 30. One or both ends of each of the rolls 32, 33 and 34 are supported. The substrate A can be driven in the direction indicated by arrow X while it is kept uniformly taut with respect to the rolls 32, 33 and 34. The position of each roll can be adjusted so as to keep the surface of the substrate A within a range of $\pm 15°$ with respect to the poles 22a and 22b.

The shield plate 31 of the apparatus 30 distinctly divides the magnetic field into upstream and downstream regions. The viscosity of the coating layer B in the upstream region where the magnetic particles are being perpendicularly oriented, may not therefore be undesirably increased.

EXAMPLE

A binder solution was prepared by dissolving 20 parts by weight of VAGH (vinyl chloride-vinyl acetate copolymer) in 120 parts by weight of a mixed solvent of methyl ethyl ketone and toluene at a ratio of 1:1. A mixture of the binder solution, 80 parts by weight of barium ferrite particles which were obtained by substituting some of Fe ions by Co-Ti and which had an average particle size of 0.15 μm, 4 parts by weight of soybean lecithin, and 1 part by weight of carbon black was mixed in a ball mill vessel for about 50 hours. A resultant paint (viscosity of 4,000 centipoises) was applied by a reverse roll coater to the upper surface of a polyester film as a nonmagnetic substrate to a thickness of 3 μm. The undried coating layer was sequentially introduced into perpendicular magnetic fields which had respective intensities of 1,000, 2,000, 3,000, 4,000 and 10,000 oersteds, while the coating layer was being dried.

The surface of the resultant coating layer was smoothed by a calender roll, and the perpendicular orientation ratio was then measured by the VSM method. The perpendicular orientation ratio is calculated by the percentage ratio of residual magnetization Mr with respect to saturation magnetization Ms. The residual magnetization Mr can be obtained by a demagnetization field adjustment in accordance with a magnetization curve which, in turn, is obtained when the surface of the coating layer B is disposed normal to the magnetic field to be measured.

The perpendicular orientation ratio of each magnetic recording medium thus obtained is shown in Table 1.

TABLE 1

| Sample No. | Magnetic field intensity for perpendicular orientation (Oe) | Perpendicular orientation ratio (%) |
|---|---|---|
| 1 | 1,000 | 65 |
| 2 | 2,000 | 73 |
| 3 | 3,000 | 78 |
| 4 | 4,000 | 89 |
| 5 | 10,000 | 92 |
| 6 | 5,000 | 70 |

It is readily understood from Table 1 that a coating layer having very small magnetic particles can be perpendicularly oriented to a sufficient degree in a strong magnetic field which has an intensity of 4,000 oersteds or more.

Sample No. 6 indicates the orientation ratio of a coating layer when it was dried after its magnetic particles had been perpendicularly oriented at an intensity of 5,000 oersteds and it had been removed from the magnetic field.

It is thus found that a high orientation ratio cannot be obtained without drying the coating layer before removal from the magnetic field even though its magnetic particles have been perpendicularly oriented in a strong magnetic field.

What we claim is:

1. A method for manufacturing a perpendicular magnetic recording medium, comprising the steps of:
    (a) generating a magnetic field which has an intensity of not less than 4,000 oersteds;
    (b) passing a nonmagnetic substrate having a coating layer thereon through said magnetic field in one direction substantially perpendicular to a direction of said magnetic field, said coating layer comprising a binder and magnetic particles which have a particle size of not more than 0.2 μm and are dispersed in said binder, and said coating layer having a viscosity of not more than $5 \times 10^4$ centipoises as measured at a shearing speed of 8.0 sec$^{-1}$;
    (c) orienting said magnetic particles in said coating layer in an upstream region of said magnetic field such that an axis of easy magnetization of said magnetic particles is aligned with the direction of said magnetic field; and
    (d) treating said coating layer which includes said magnetic particles which have been oriented, in a downstream region of said magnetic field such that a viscosity of said coating layer is increased to at least $10^5$ centipoises as measured at a shearing speed of 8.0 sec$^{-1}$, thereby restricting further movement of said magnetic particles in said coating layer before said coating layer is removed from said magnetic field.

2. The method as claimed in claim 1, wherein the step (d) comprises blowing heated air onto said coating layer along a longitudinal direction of said nonmagnetic substrate.

3. The method as claimed in claim 1, wherein, the step (d) comprises blowing heated air onto said coating layer toward a direction of width of said nonmagnetic substrate, with a shield plate distinctly dividing said magnetic field into said upstream region and said downstream region.

4. The method as claimed in claim 1, wherein, the step (d) comprises heating a nonmagnetic support member in said downstream region so as to dry said coating layer by heat generated therefrom, said nonmagnetic support member supporting said nonmagnetic substrate at least in said downstream region of said magnetic field.

5. The method as claimed in claim 2, wherein said magnetic particle comprises hexagonal ferrite.

6. An apparatus for manufacturing a perpendicular magnetic recording medium, comprising:
    means for generating a magnetic field which has an intensity of not less than 4,000 oersteds;
    means for passing a nonmagnetic substrate having a coating layer thereon through said magnetic field in one direction substantially perpendicular to a direction of said magnetic field, said coating layer comprising a binder and magnetic particles which have a particle size of not more than 0.2 μm and are dispersed in said binder, and said coating layer having a viscosity of not more than $5 \times 10^4$ centipoises as measured at a shearing speed of 8.0 sec$^{-1}$; and
    means for orienting said magnetic particles in said coating layer in an upstream region of said magnetic field such that an axis of easy magnetization of said magnetic particles is aligned with the direction of said magnetic field and for treating said coating layer in a downstream region of said magnetic field such that a viscosity of said coating layer is increased to at least $10^5$ centipoises at a shearing speed of 8.0 sec$^{-1}$ so as to restrict further movement of said magnetic particles in said coating layer before said coating layer is removed from said magnetic field, said treating means being disposed in said downstream region.

7. The apparatus as claimed in claim 6, wherein said magnetic field generating means comprises a magnet which has a first pole of one polarity and a second pole of a polarity opposite to said one polarity, said first and second poles being parallel to and opposing each other.

8. The apparatus as claimed in claim 7, further comprising a nonmagnetic support member for supporting said nonmagnetic base in said magnetic field.

9. The apparatus as claimed in claim 8, wherein said treating means comprises heating means for heating said nonmagnetic support member in said downstream region.

10. The apparatus as claimed in claim 8, wherein said treating means comprises air blowing means for blowing air having an elevated temperature onto said coating layer in said downstream region of said magnetic field.

11. The apparatus as claimed in claim 10, wherein said air blowing means comprises means for blowing air onto said coating layer in a direction of travel of said coating layer.

12. The apparatus as claimed in claim 10, further comprising a shield plate for dividing said magnetic field into said upstream region and said downstream region.

* * * * *